United States Patent
Sugiyama

(10) Patent No.: US 7,839,531 B2
(45) Date of Patent: Nov. 23, 2010

(54) PRINTING CONTROL METHOD

(75) Inventor: Kouichi Sugiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1187 days.

(21) Appl. No.: 10/728,951

(22) Filed: Dec. 8, 2003

(65) Prior Publication Data
US 2004/0114184 A1 Jun. 17, 2004

(30) Foreign Application Priority Data
Dec. 10, 2002 (JP) .............................. 2002-358313

(51) Int. Cl.
*G06F 15/00* (2006.01)
(52) U.S. Cl. ................... 358/1.18; 358/1.16; 358/1.15; 358/1.12; 399/84; 400/76
(58) Field of Classification Search ............... 358/1.15, 358/1.18, 1.16, 1.6, 1.1, 1.9, 296, 1.13, 1.14, 358/1.12; 347/1.17, 129; 399/382, 60, 82, 399/84; 400/76; 701/60
See application file for complete search history.

(56) References Cited

U.S. PATENT DOCUMENTS

| | | | | |
|---|---|---|---|---|
| 5,155,341 A | | 10/1992 | Ohtani et al. ................ 235/375 |
| 5,243,381 A | * | 9/1993 | Hube ............................ 399/84 |
| 5,722,650 A | | 3/1998 | Yamamoto et al. ....... 270/58.02 |
| 5,859,711 A | * | 1/1999 | Barry et al. ................. 358/296 |
| 5,887,223 A | * | 3/1999 | Sakai et al. .................... 399/60 |
| 6,249,741 B1 | * | 6/2001 | Iwasaki et al. ............... 701/202 |
| 6,267,517 B1 | * | 7/2001 | Noda ........................... 400/76 |
| 6,373,588 B1 | * | 4/2002 | Fischer et al. .............. 358/1.16 |
| 6,538,770 B1 | * | 3/2003 | Mestha ....................... 358/1.9 |
| 6,956,664 B1 | * | 10/2005 | Kutty ........................ 358/1.15 |
| 2001/0031150 A1 | * | 10/2001 | Shimada et al. ............... 399/82 |
| 2002/0075497 A1 | * | 6/2002 | Mantell ..................... 358/1.13 |
| 2002/0089689 A1 | * | 7/2002 | Ferlitsch et al. ............ 358/1.15 |
| 2002/0131069 A1 | * | 9/2002 | Wanda ....................... 358/1.14 |
| 2003/0020957 A1 | * | 1/2003 | Brewster ................... 358/3.28 |

FOREIGN PATENT DOCUMENTS

EP 1162824 A2 * 12/2001

* cited by examiner

*Primary Examiner*—Edward L Coles
*Assistant Examiner*—Ashish K Thomas
(74) *Attorney, Agent, or Firm*—Fitzpatrick, Cella, Harper & Scinto

(57) ABSTRACT

When multiple print jobs that include banner printing are combined and prescribed manipulation settings are specified, data for banner printing is processed separately of the multiple items of print data and the multiple items of print data are combined into a single item of print data, and newly created data for banner printing and the print data that has been combined is output. As a result, it is possible to avoid problems that arise from the combining of jobs for which banner printing settings and settings for finishing processing or layout processing have been made concurrently, and a user can be provided with the optimum printout by adapting processing in accordance with circumstances.

9 Claims, 16 Drawing Sheets

FIG. 8B
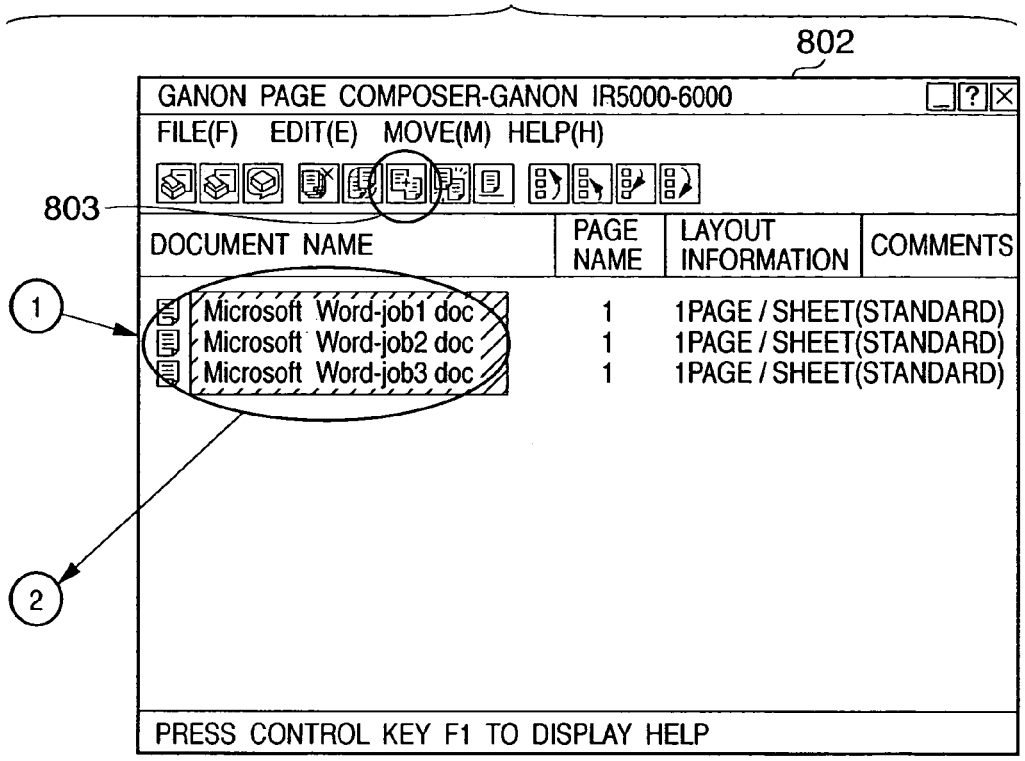
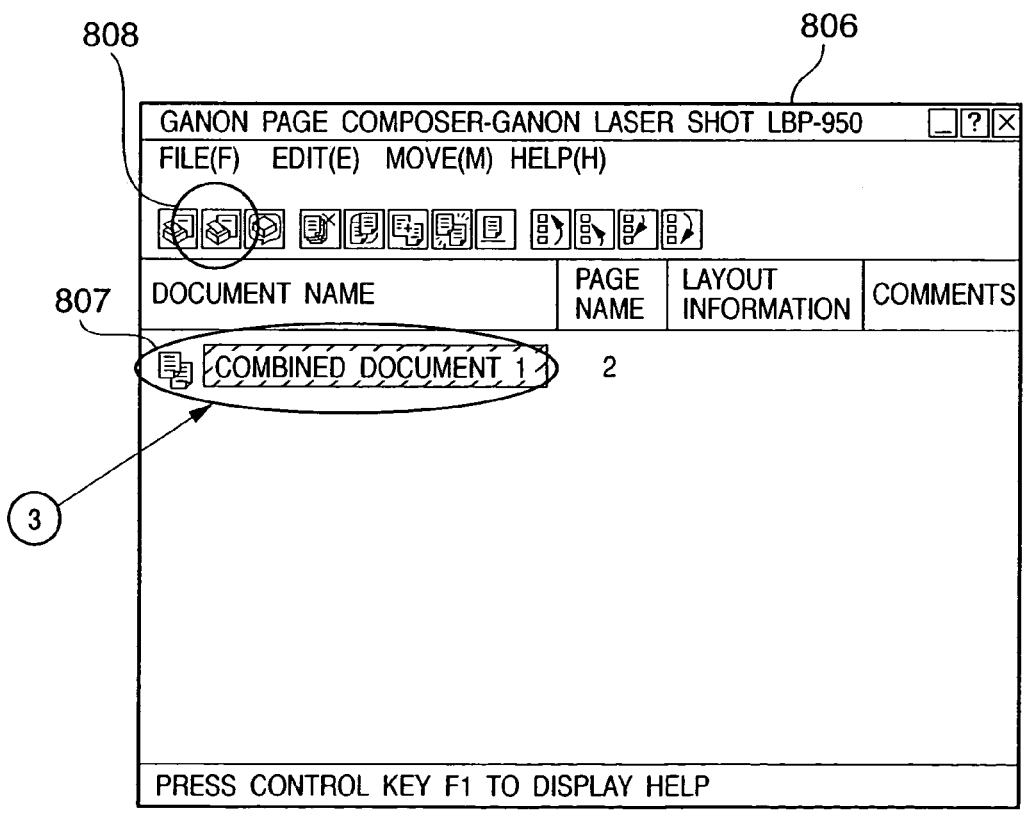

FIG. 9
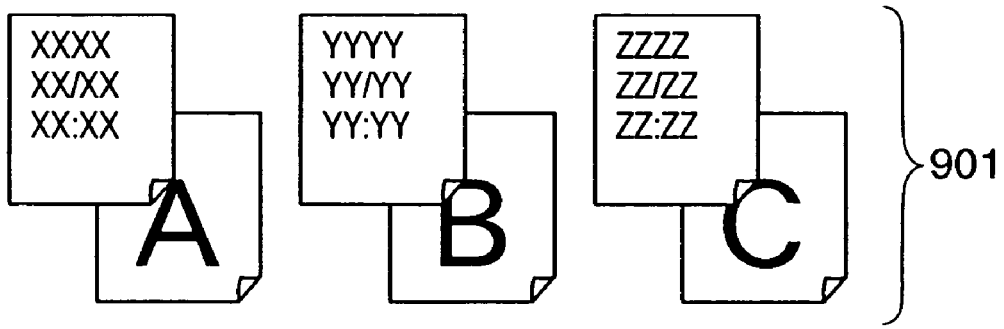
901
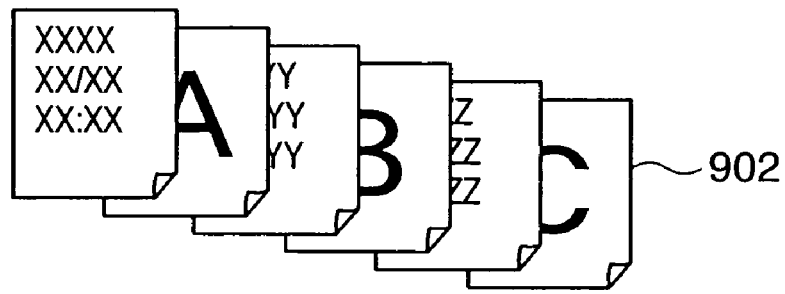
902
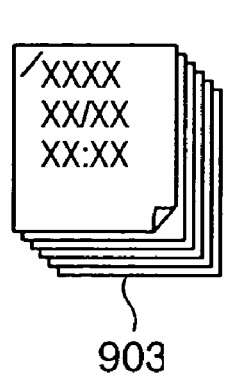
903
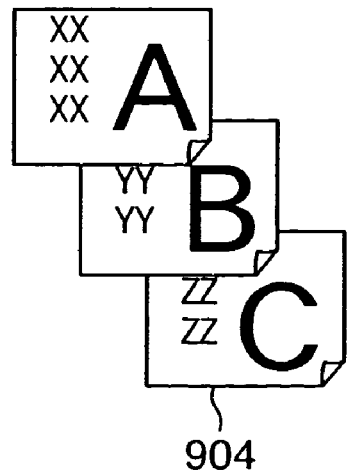
904

FIG. 11A
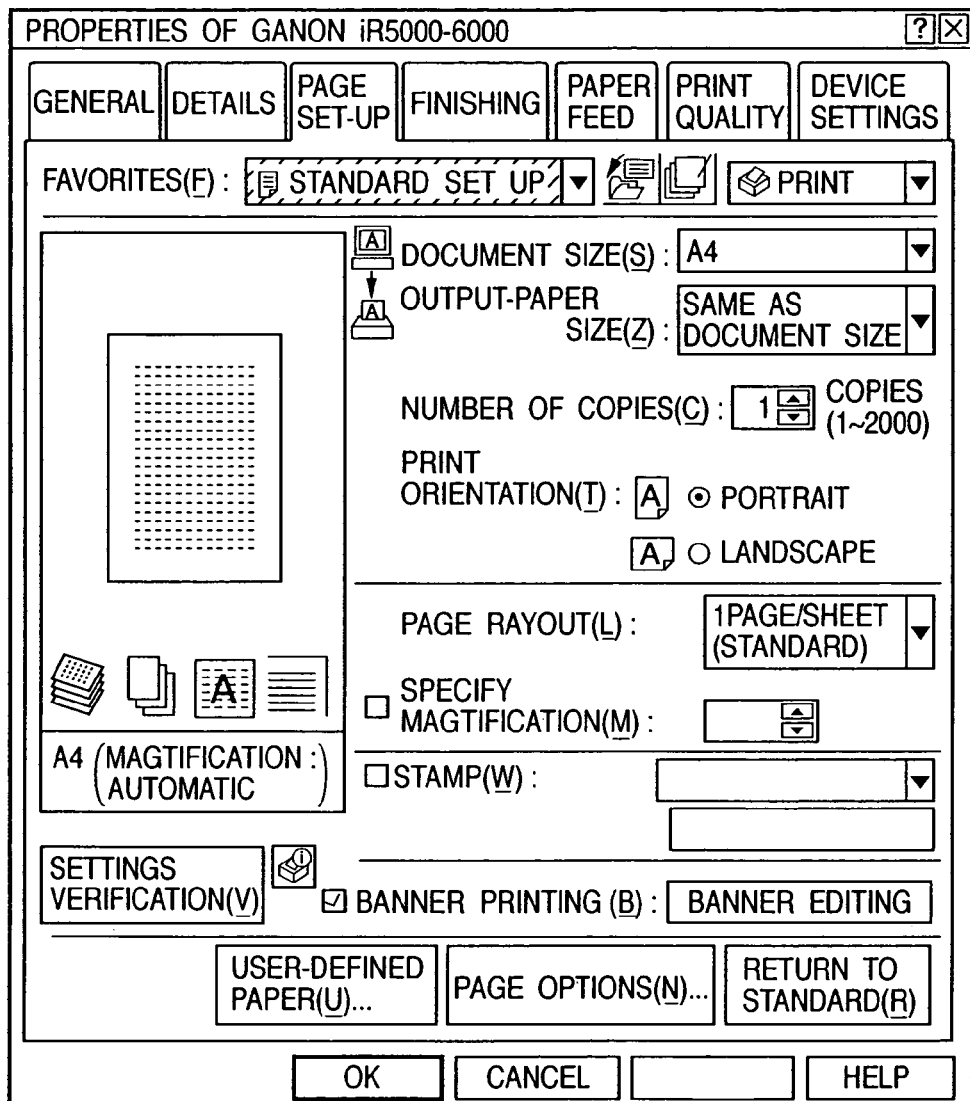
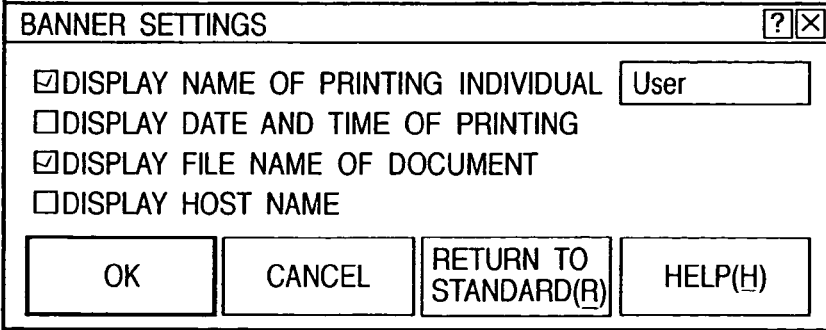

FIG. 13

FIRST LAYER
  SETTINGS WITH REGARD TO OVERALL JOB

SECOND LAYER
  SETTINGS FOR PRINTING METHOD
  SETTINGS FOR PAPER FEED METHOD
  SETTING FOR FINISHING METHOD
  ETC...

PRINT DATA INDICATED IN BANNER
  "Name : XXXX"
  "Time : XX:XX"

ACTUAL PRINT DATA
  "A"

PRINT DATA INDICATED IN BANNER
  "Name : YYYY"
  "Time : YY:YY"

ACTUAL PRINT DATA
  "B"

PRINT DATA INDICATED IN BANNER
  "Name : ZZZZ"
  "Time : ZZ:ZZ"

ACTUAL PRINT DATA
  "C"

FIG. 14

FIRST LAYER
  SETTINGS WITH REGARD TO OVERALL JOB

SECOND LAYER (1)
    SPECIFY THAT DATA IS DATA FOR BANNER OUTPUT

PRINT DATA INDICATED IN BANNER
      "Name : NNNN"
      "Time : NN:NN"

SECOND LAYER (2)
    SETTINGS FOR PRINTING METHOD
    SETTINGS FOR PAPER FEED METHOD
    SETTING FOR FINISHING METHOD
    ETC...

ACTUAL PRINT DATA
      "A"

ACTUAL PRINT DATA
      "B"

ACTUAL PRINT DATA
      "C"

PRINTING CONTROL METHOD

FIELD OF THE INVENTION

This invention relates to a printing control method in a printing system comprising an information processing apparatus such as a personal computer and a printing apparatus such as a printer.

BACKGROUND OF THE INVENTION

Printing systems have a so-called banner printing function that facilitates the identification of printed matter by inserting a single sheet of paper bearing information (name of the printing individual, printing time, name of the printed matter, etc.) at the beginning of the printout. On the other hand, printing systems have a so-called job combining function for converting print data to intermediate code, storing the intermediate code temporarily, executing processing that combines multiple items of stored intermediate data into a single intermediate code and making it possible to apply batch layout processing or finishing processing to printing from within a plurality of applications.

However, consider a case where multiple jobs, for each of which banner printing has been set, are combined and finishing printing or layout printing has been specified, or a case where multiple jobs, for each of which banner printing has been set as well as finishing processing or layout processing, are combined. If one combined job is printed out in accordance with the specified settings in either of these cases, a printed result that the user does not intend may result in an instance where multiple jobs set for banner printing are combined and stapled or where two pages are output per sheet, as shown in FIG. 9. For example, banner print may appear in the middle of a stapled output or banner print and print data may be laid out on a single page.

SUMMARY OF THE INVENTION

Accordingly, an object of the present invention is to provide a user with the optimum printout by making it possible to avoid problems arisen in finishing processing and layout processing when a banner printing job is combined, and by adapting processing to circumstances.

Another object of the present invention is to provide the optimum printout, in a manner transparent to the user, by automatically combining jobs internally in accordance with the conditions set for banner printing, layout processing and finishing processing.

In accordance with the present invention, the foregoing objects are attained by providing a method of controlling printing in a printing system having a banner printing function and a function for combining multiple print jobs, comprising: a processing step of processing data for banner printing separately of multiple items of print data when multiple print jobs that include banner printing are combined and prescribed manipulation settings are specified; a combining step of combining the multiple items of print data into a single item of print data; and an output step of outputting the data for banner printing processed at the processing step and the print data that has been combined.

According to another aspect of the present invention, the foregoing objects are attained by providing a printing system having a banner printing function and a function for combining multiple print jobs, comprising: processing means for processing data for banner printing separately of multiple items of print data when multiple print jobs that include banner printing are combined and prescribed manipulation settings are specified; combining means for combining the multiple items of print data into a single item of print data; and output means for outputting the data for banner printing processed at the processing means and the print data that has been combined.

According to another aspect of the present invention, the foregoing objects are attained by providing an information processing apparatus of a printing system comprising the information processing apparatus and a printing apparatus and having a banner printing function and a function for combining multiple print jobs, the information processing apparatus comprising: processing means for processing data for banner printing separately of multiple items of print data when multiple print jobs that include banner printing are combined and prescribed manipulation settings are specified; combining means for combining the multiple items of print data into a single item of print data; and output means for outputting the data for banner printing processed at the processing means and the print data that has been combined.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A and 8B are diagrams illustrating a user interface based upon a printer driver;

FIG. 9 is a diagram illustrating an example of output results when joint use is made of banner printing and combining of jobs;

FIGS. 11A and 11B are diagrams illustrating intermediate code for a banner and intermediate code for print data according to this embodiment;

FIG. 13 is a diagram illustrating the structure of a print job in a case where a banner has not been set again; and FIG. 14 is a diagram illustrating the structure of a print job in a case where a banner has been set again.

DETAILED DESCRIPTION OF THE PREFERRED EMBODIMENT

A preferred embodiment of the present invention will now be described in detail with reference to the drawings.

First, before describing this embodiment, a system comprising a printer and an information processing apparatus such as a personal computer connected to the printer to which the invention is applicable will be described. In particular, there will be described a printing system having a spooler serving as spooling means for temporarily storing print data in a data format (so-called intermediate code) different from that of print data finally sent to the printer, this being performed before print data to be transmitted to the printer is generated in the information processing apparatus; a despooler serving as despooling means for again generating print data, which is finally sent to the printer, from data that has been stored temporarily in the format of intermediate code; and a printer driver serving as means for generating a printer control command.

Figure 1:
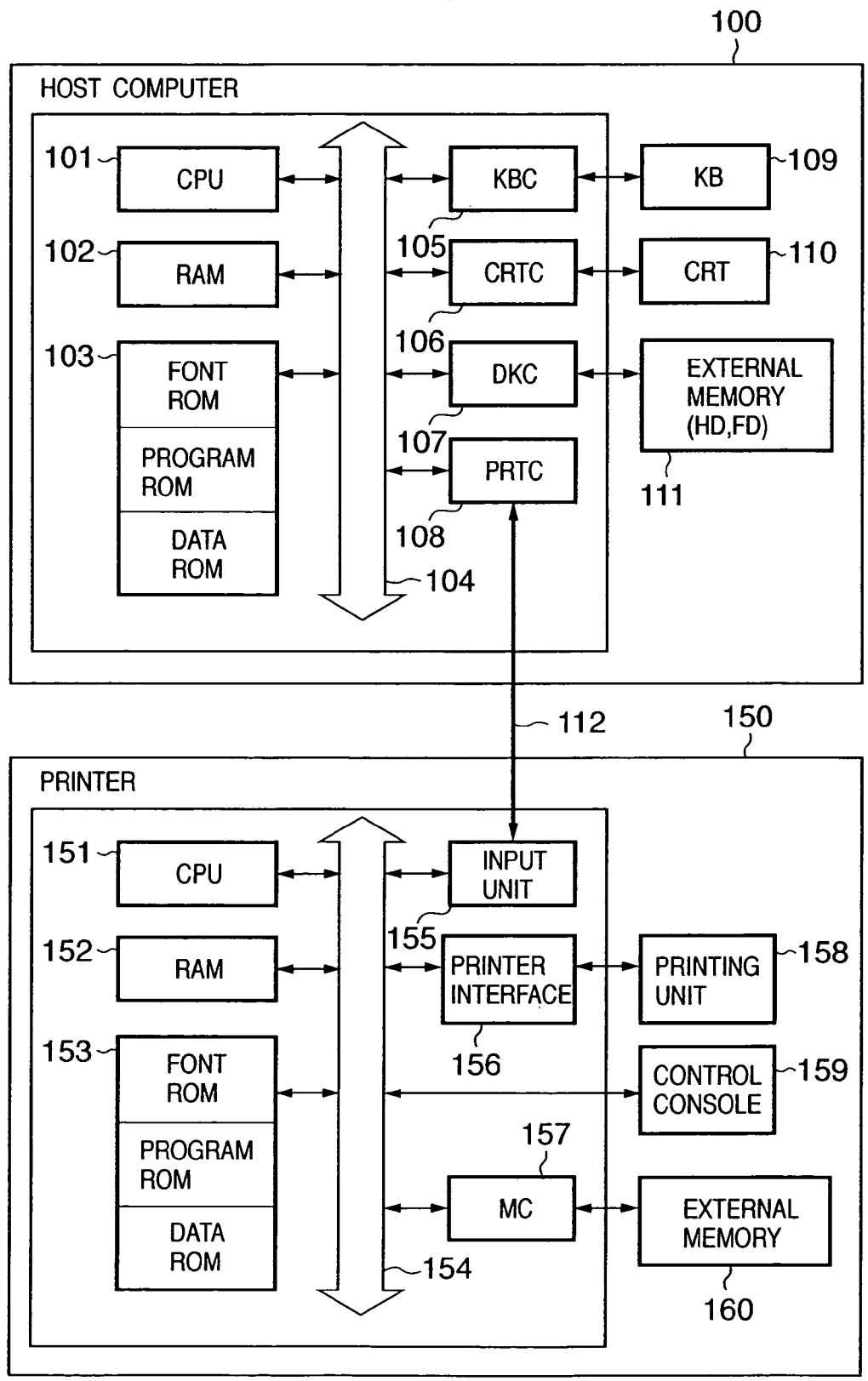
FIG. 1 is a block diagram useful in describing the configuration of a printing system according to an embodiment of the present invention.

FIG. 1 is a block diagram useful in describing the configuration of a printing system according to an embodiment of the present invention. The present invention can be applied to a single device, a system constituted by a plurality of devices or a system that connected via a network such as a LAN or WAN and processing is performed, if the function of the present invention can be executed.

As shown in FIG. 1, a host computer 100 has a CPU 101 which, on the basis of a word processing program that has been stored in a program ROM of a ROM 103 or in an external memory 111, executes the word processing of a document containing mixed objects such as graphics, images, text and tables (inclusive of spreadsheets, etc.). The CPU 101 performs overall control of various devices connected to a system bus 104. Further, an operating system, which is the control program of the CPU 101, is stored in the program ROM in ROM 103 or in the external memory 111. Further, a font ROM in ROM 102 or the external memory 111 stores font data, etc., used when the above-mentioned word processing is executed. Furthermore, a data ROM in ROM 3 or the external memory 111 stores various data used when word processing, etc., is executed. A RAM 102 functions as the main memory and work area of the CPU 101.

A keyboard controller (KBC) 105 controls key inputs from a keyboard (KB) 109 and a pointing device, which is not shown. A CRT controller (CRTC) 106 controls the display on a CRT display 110. A disk controller (DKC) 107 controls access to an external memory 111, such as a hard disk or floppy disk, which stores a booting program, various applications, font data, user files, edited files and a program (referred to as a "printer driver" below) for generating printer control commands. A printer controller (PRTC) 108, which is connected to a printer 150 via a prescribed bidirectional interface 112, executes processing for controlling communication with the printer 150.

It should be noted that the CPU 101 executes processing to expand (rasterize) outline fonts in a display RAM provided in, say, the RAM 102, and is capable of implementing a WYSIWYG (What You See I What You Get) function on the CRT 110. Further, on the basis of commands designated by a mouse cursor (not shown) or the like on the CRT 110, the CPU 101 opens various windows that have been registered and executes a variety of data processing. When the user executes printing, it is possible to set a print processing method with regard to the printer driver, inclusive of opening windows relating to the printing settings, setting the printer and selecting the print mode.

The printer 150 is controlled by a CPU 151. On the basis of a control program, etc., stored in a program ROM of a ROM 153 or a control program, etc., stored in an external memory 160, the CPU 151 outputs an image signal, which serves as output information, to a printing unit (printer engine) 156 connected via a system bus 154. The control program of the CPU 151, which is indicated by a flowchart illustrated later, is stored in the program ROM of ROM 153. Font data, etc., used when the above-described output information is generated is stored in a font ROM of ROM 153. In case of a printer not having the external memory 160 such as a hard disk, information and the like utilized by the host computer is stored in a data ROM of ROM 153.

The CPU 151, which is capable of communicating with the host computer 100 via an input unit 155, is capable of reporting information within the printer to the host computer 100. A RAM 152 functions as a main memory or work area of CPU 151 and is so adapted that its memory capacity can be extended by optional RAM connected to an expansion port (not shown). It should be noted that the RAM 152 is used as an area for expanding output information, an area for storing environment data and a NVRAM, etc. An external memory 160 such as the above-mentioned hard disk or an IC card has its access controlled by a memory controller (MC) 157. The external memory 160 is connected as an option and stores font data, an emulation program and form data, etc. A control console 159 is an array of switches and LED indicators for exercising control.

The external memory 160 is not limited to a single memory, and a plurality thereof may be provided. It may be so arranged that a plurality of optional font cards, which supplement internal fonts, and a plurality of external memories storing programs for interpreting printer control languages of different language systems can be connected. Furthermore, the apparatus may have an NVRAM (not shown) for storing printer mode setting information entered from the control panel 159.

Described next will be typical print processing executed by a host computer to which a printing apparatus such as a printer is connected directly or via a network.

Figure 2:
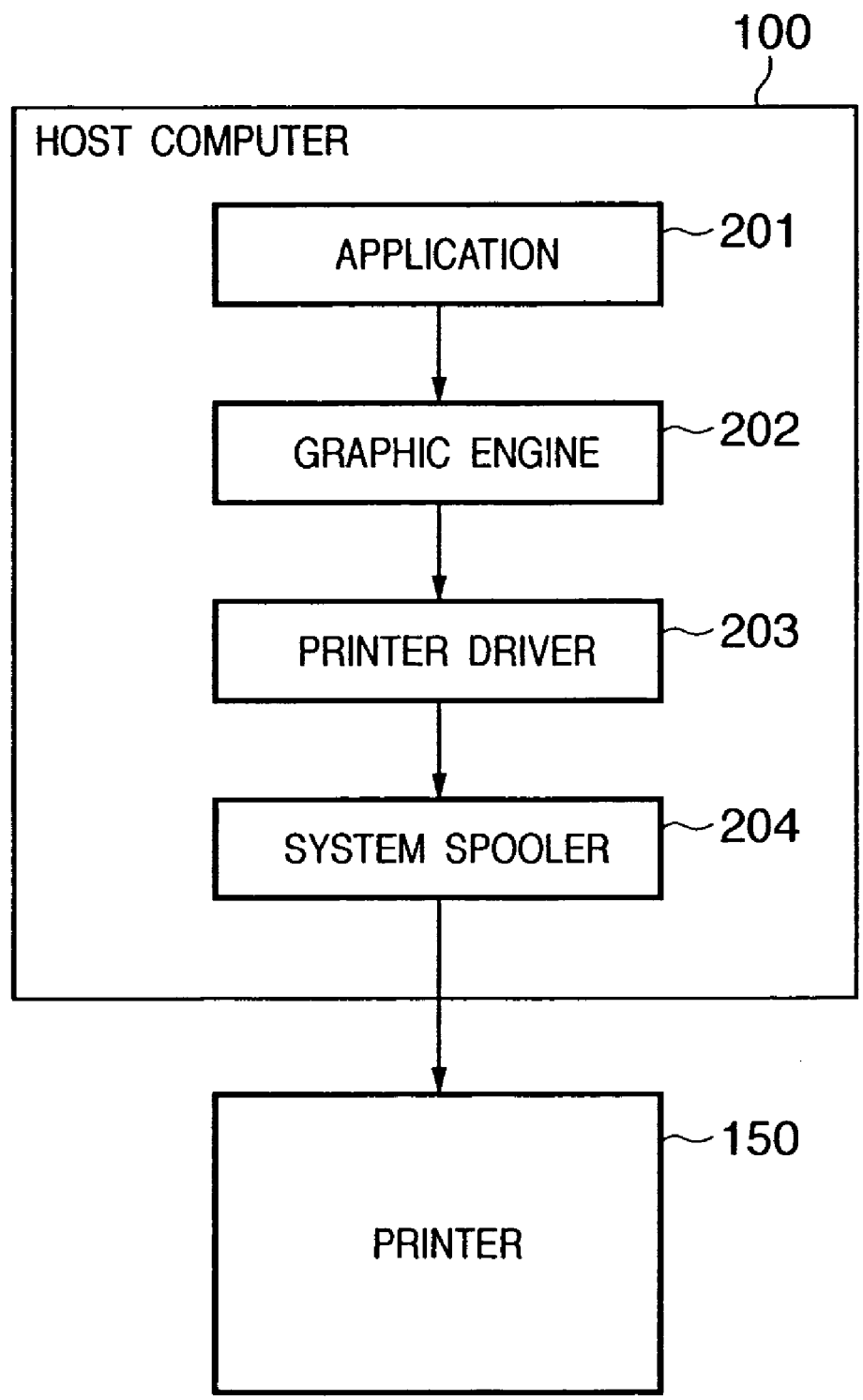
FIG. 2 is a diagram illustrating typical print processing executed by a host computer.

FIG. 2 is a diagram showing typical print processing executed by the host computer 100. An application 201, graphic engine 202, printer driver 203 and system spooler 204 in FIG. 2 are retained in the external memory 111 as files. These are program modules which, when they are to be executed, are loaded in the RAM 102 and executed by the operating system and by modules which utilize these modules. The application 201 and the printer driver 203 can be stored on a floppy disk or CD-ROM (not shown) serving as the external memory 111 or can be stored on the hard disk serving as the external memory 111 via a network, not shown.

First, in a case where printing is performed, the application 201 stored in the external memory 111 can be executed upon being loaded in the RAM 102. If the keyboard 109 or a mouse (not shown) is used to command the printer 150 to perform printing from within the application 201, the graphic engine 202 similarly loaded in the RAM 102 and rendered executable is utilized to perform output (rendering).

The graphic engine 202 similarly loads the printer driver 203, which is prepared for each printing apparatus, from the external memory 111 to the RAM 102 and sets the output from the application 201 in the printer driver 203. A conversion is made to a DDI (Device Driver Interface) function based upon a GDI (Graphic Device Interface) accepted from the application 201, and the DDI function is output to the printer driver 203.

As a result of the foregoing, the printer driver 203 makes a conversion to a control command recognizable by the printer 150, e.g., to PDL (Page Description Language), based upon DDI function received from the graphic engine 202. The printer control command obtained by the conversion is delivered to the system controller 204 that has been loaded in the RAM 202 by the operating system and is output to the printer 150 as print data via the interface 112.

The printing system according to this embodiment will now be described. In this embodiment, the printing system of FIG. 2 comprising the printer and host computer further includes components for performing banner printing shown in FIG. 3 and components for temporarily spooling, as intermediate code, print data from the application shown in FIG. 7.

Figure 3:
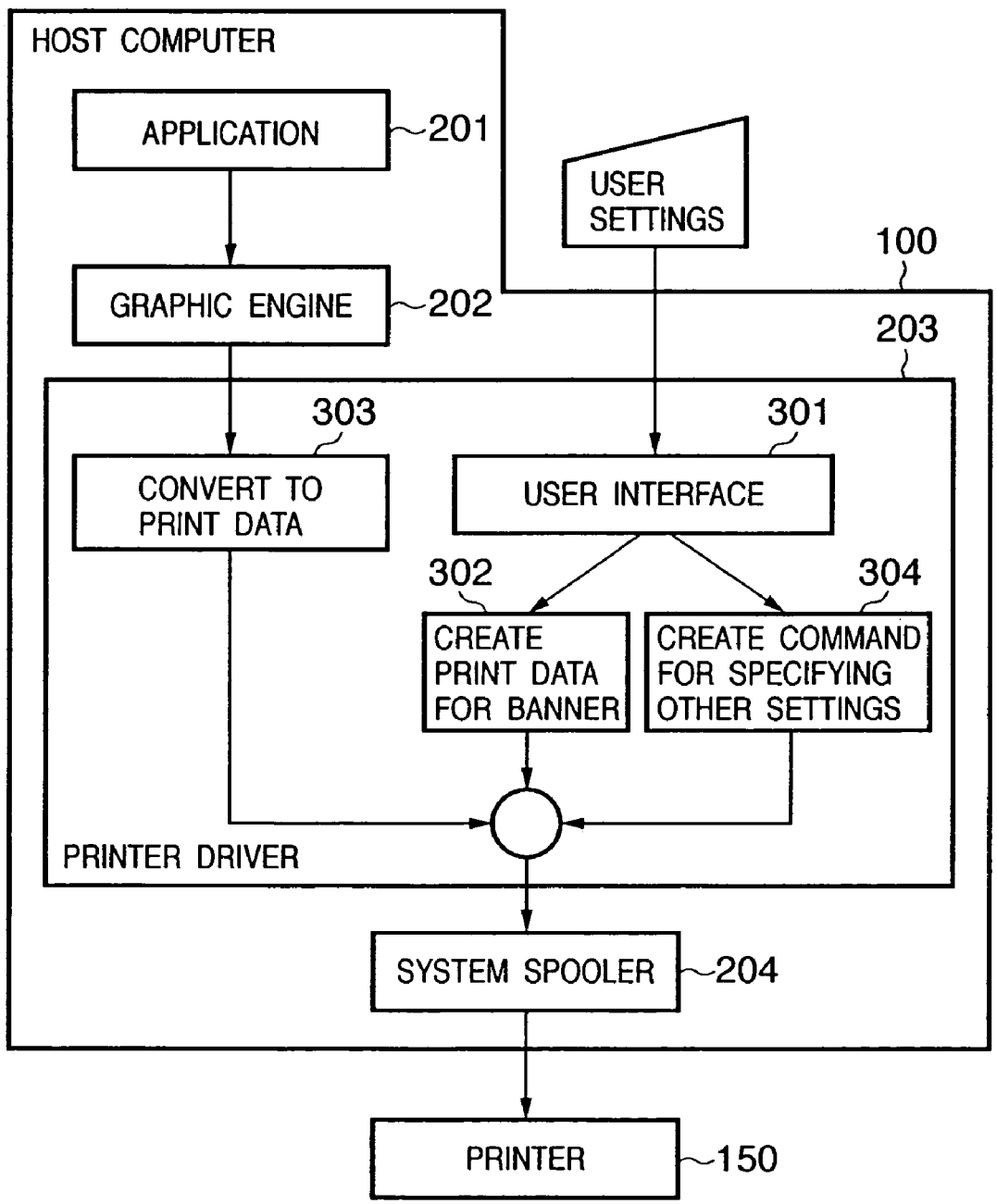
FIG. 3 is a diagram useful in describing banner printing by a printer driver.

FIG. 3 is a diagram useful in describing banner printing by the printer driver. It should be noted that the setting of banner printing is performed by the user, before the start of print processing, on a user interface 301 of FIG. 4 provided by the printer driver 203.

Figure 4:
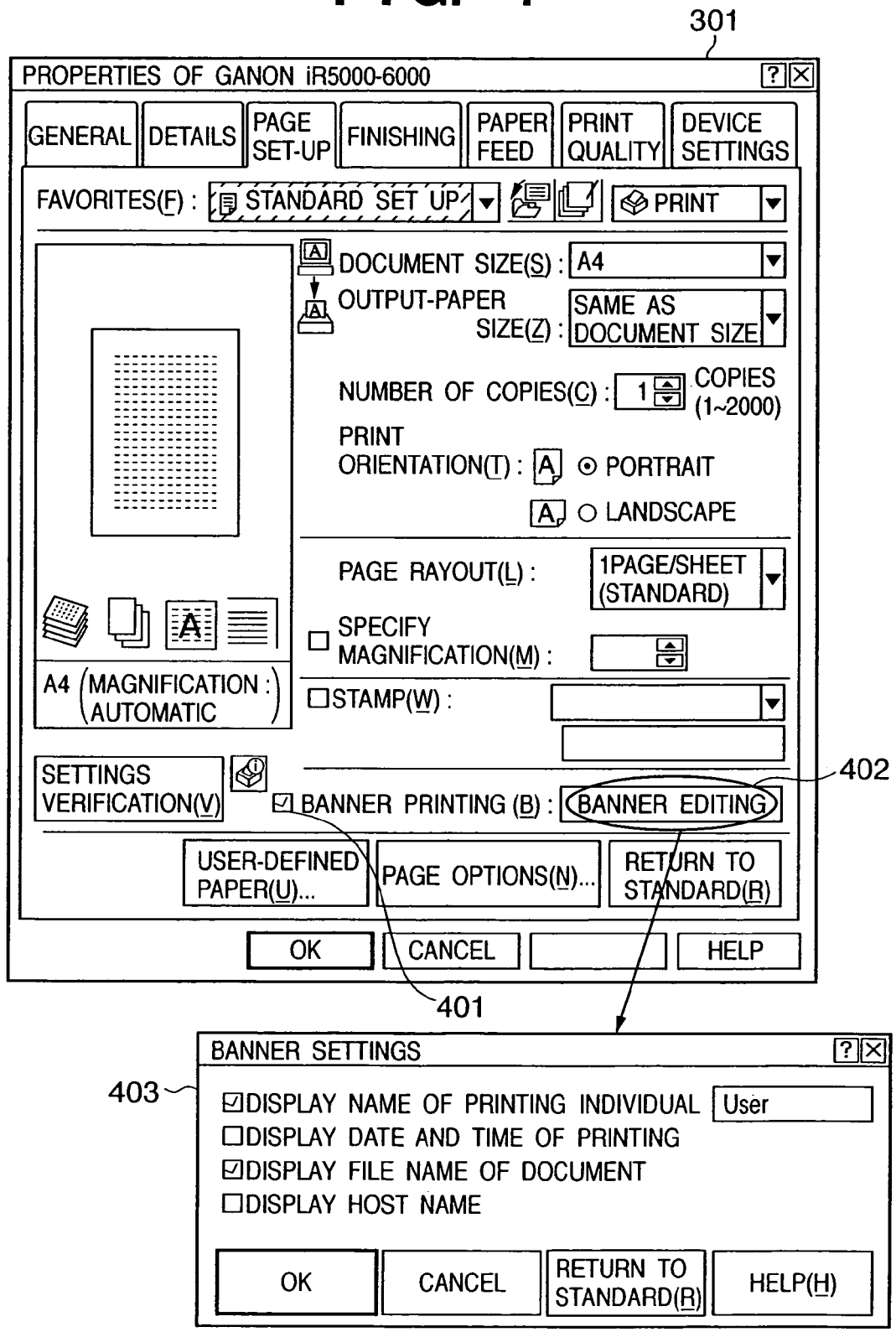
FIG. 4 is a diagram illustrating an example of a user interface for specifying banner printing.

FIG. 4 is a diagram illustrating an example of the user interface 301 for designating banner printing. In this example, banner printing is designated in the form of a check box 401. Specifically, by checking the check box 401, the user designates banner printing and the printer driver 203 executes processing for banner printing based upon the designation made. In response to a banner editing button 402 being clicked by the user, a pop-up menu screen 403 for setting the banner is displayed and the user is capable of selecting information desired to be indicated in the banner. In the example shown in FIG. 4, the name of the printing individual, the printing date and time, the document file name and the host name (computer name) can be selected. The name of the printing individual can be specified at will by the user. These settings are stored temporarily in the RAM 102 or external memory 111 and, when actual printing is executed, are called from the printer driver 203 and reflected in print processing.

With reference again to FIG. 3, the printer driver 203 determines whether banner printing has been designated on the user interface 301 when print processing is started by the application 201. If banner printing has been designated, the printer driver 203 creates print data for banner printing internally (302). The created print data for the banner is combined with ordinary print data 303 that has been generated based upon a designation made from within the application 201, a command 304 is attached for specifying print settings such as finishing processing and layout specification, described later, after which the data is output to the system spooler 204 in a manner similar to that when ordinary printing is performed.

Figure 5:
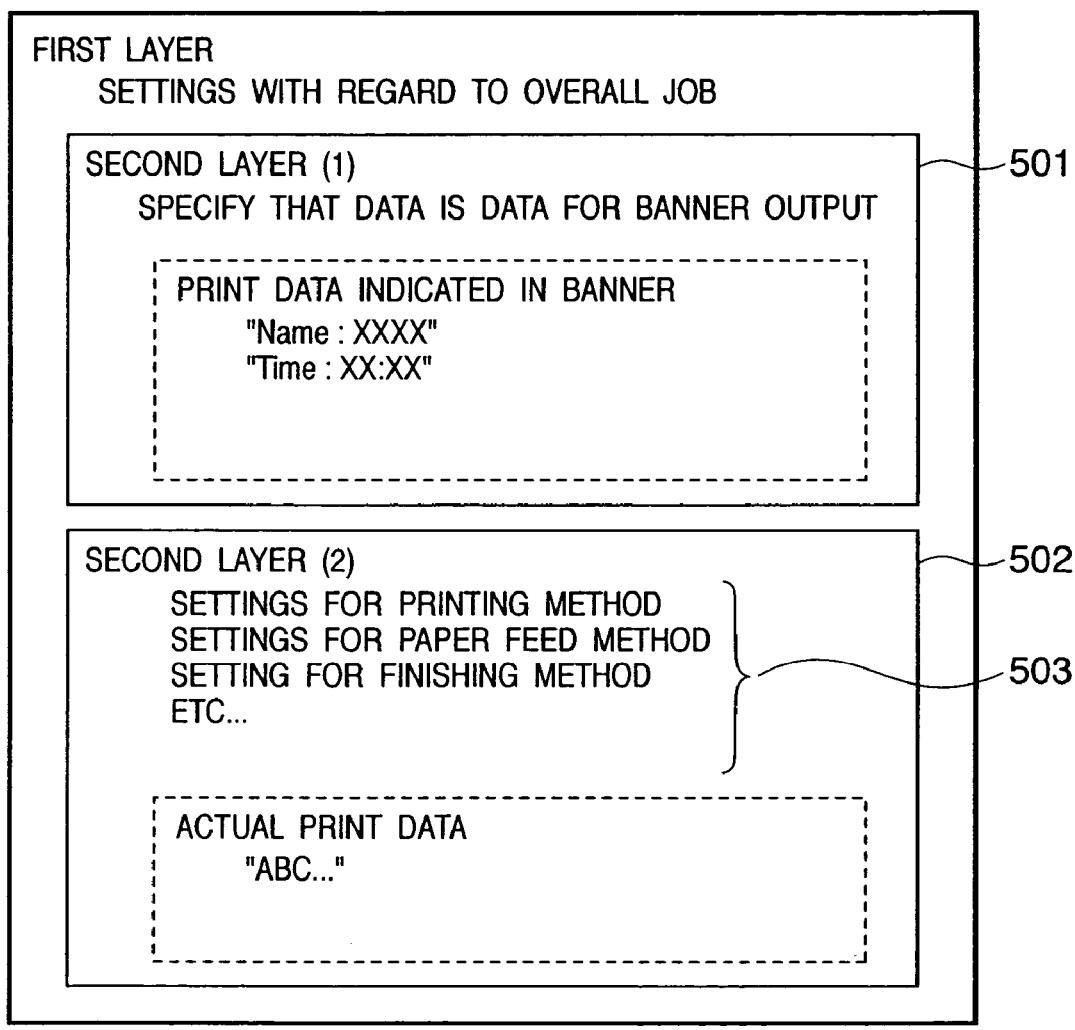
FIG. 5 is a diagram illustrating an example of data output to a system spooler.

FIG. 5 is a diagram illustrating an example of data output to the system spooler 204. As shown in FIG. 5, the structure of data in this embodiment is hierarchical. By dividing a second layer into two layers, print data 501 for banner printing and actual print data 502 that specifies an application are distinguished internally. Further, by specifying print settings 503, namely finishing processing and layout specification, with respect to each of the second layers, it is possible to isolate banner printing from print settings such as layout finishing applied to ordinary print data, thereby enabling these to be applied to a single individual sheet of paper.

From this point onward, data and commands are transferred to the printer 150 and the printer 150 performs banner printing and ordinary printing in accordance with these print commands.

Figure 6:
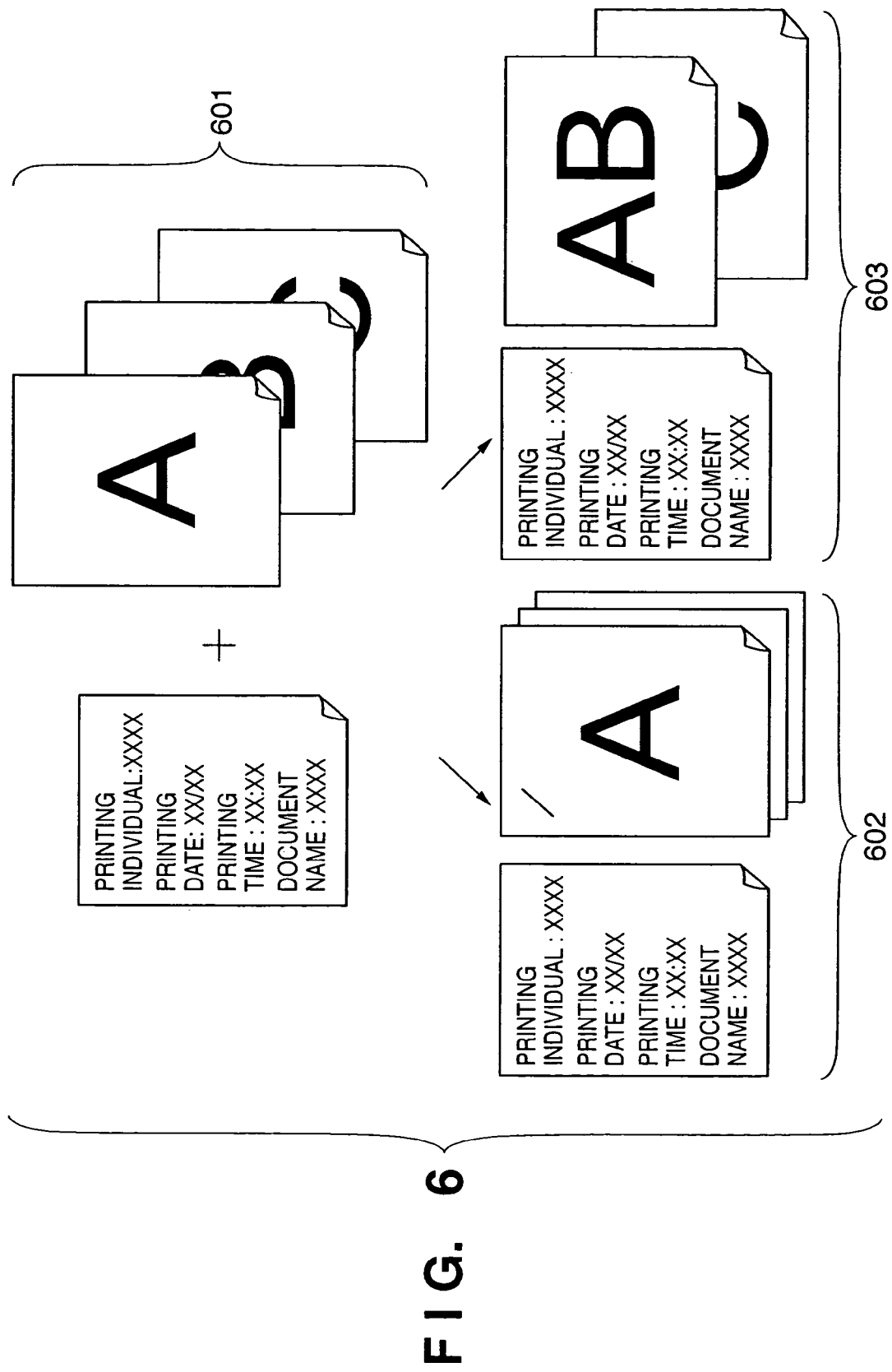
FIG. 6 is a diagram illustrating an example of output results when a banner setting is made in this embodiment.

FIG. 6 is a diagram illustrating an example of output results when a banner setting is made in this embodiment. Shown in FIG. 6 are an output result 601 in a case where only banner printing has been designated, settings 602 for banner printing and stapling, and an output result 603 in a case where banner printing and a change in layout (two pages per sheet) are used concurrently.

Described next is a method of implementing combining of jobs in which a job involving the above-described banner printing and a job involving printing settings for layout or finishing are combined.

Figure 7:
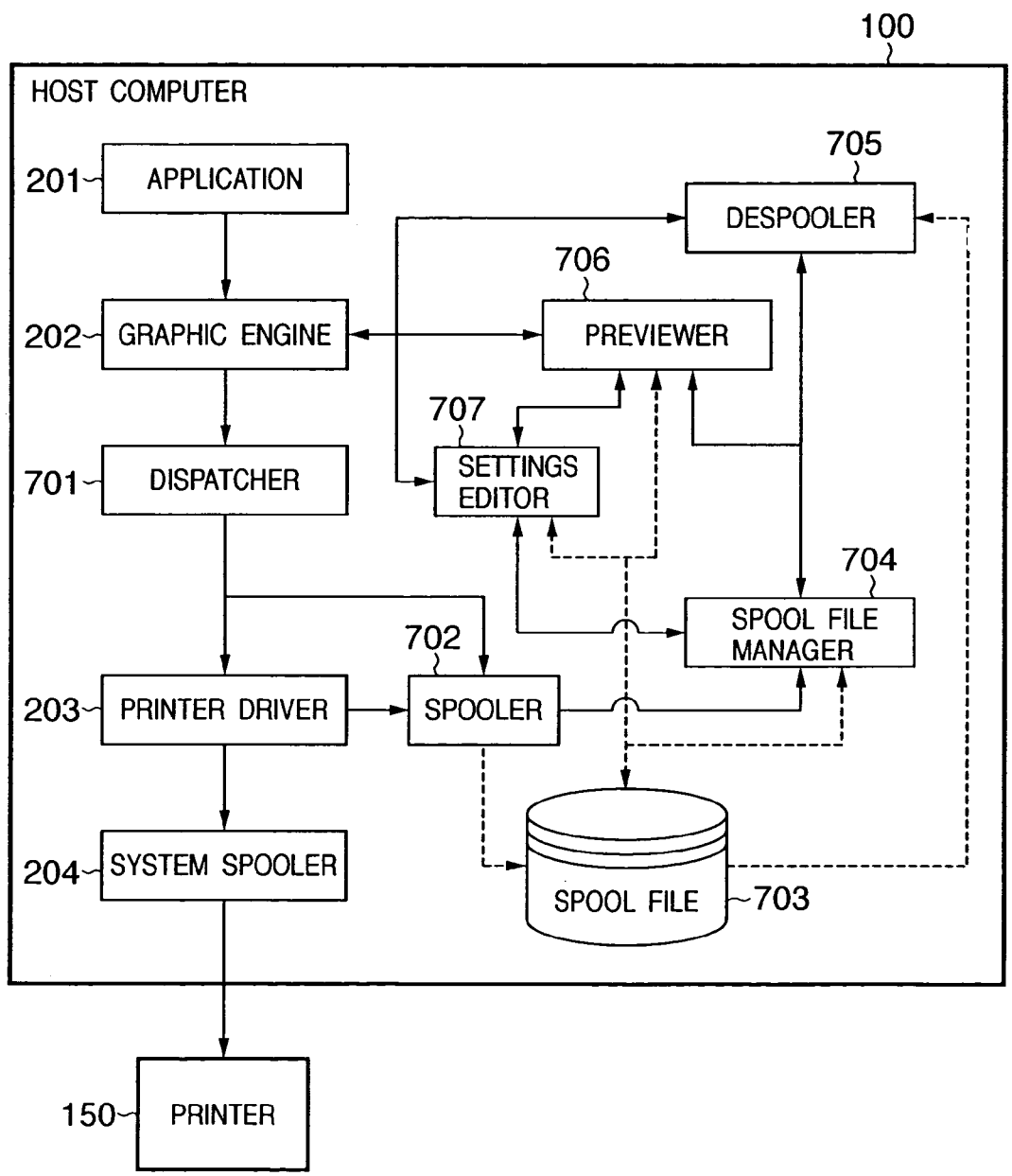
FIG. 7 is a diagram illustrating an arrangement for temporarily generating a spool file, which comprises intermediate code, when a print instruction is sent from a graphic engine to a printer driver.

FIG. 7 is a diagram illustrating an arrangement for temporarily generating a spool file 703, which comprises intermediate code, when a print instruction is sent from the graphic engine 202 to the printer driver 203. In the system depicted in FIG. 7, the content of the spool file 703 can be manipulated. This means that a function not possessed by the application 201 can be implemented. For example, print data from the application 201 can be printed upon being enlarged or reduced in size, and multiple pages of the print data can be reduced to a single sheet of paper and printed.

In order to attain these objectives, the system of FIG. 2 is expanded in such a manner that print data is spooled in the form of intermediate codes in the system shown in FIG. 7. In order to manipulate the print data, the user usually makes settings using a window provided by the printer driver 203 and the printer driver 203 saves the set content in the RAM 102 or external memory 111.

The details of print processing in the system shown in FIG. 7 will now be described. As illustrated in FIG. 7, the processing scheme thus expanded is such that a DDI function, which is a print instruction from the graphic engine 202, is accepted by a dispatcher 701. In a case where a print instruction (DDI function) that the dispatcher 301 has accepted from the graphic engine 202 is one based upon a print instruction (GDI function) that the application 201 issued to the graphic engine 202, the dispatcher 701 loads the spooler 702, which has been stored in the external memory 111, into the RAM 102 and sends the print instruction (DDI function) to the spooler 702 and not the printer driver 203.

The spooler 702 analyzes the accepted print instruction, converts the instruction to an intermediate code page by page and outputs the code to a spool file 703. A spool file of intermediate code that has been stored page by page is referred to as page description file (PDF). Further, the spooler 702 acquires the manipulation settings (designation of bookbinding printing, Nup, double-sided printing, stapling and color/monochrome, etc.), which relate to print data set with regard to the printer driver 203, from the printer driver 203 and stores the data in the spool file 703 as files on a per-job basis. A settings file that has been stored on a per-job basis is referred to as a job settings file (SDF; also referred to as a spool description file).

Though the spool file 303 is generated as a file in the external memory 111, the file may be generated in the RAM 102.

Furthermore, the spooler 702 loads a spool file manager 704, which has been stored in the external memory 111, into the RAM 102 and notifies the spool file manager 704 of the status of spool file generation. In accordance with the content of the manipulation settings relating to the print data stored in the spool file 703, the spool file manager 704 subsequently determines whether printing can be performed.

When the spool file manager 704 has judged that printing can be performed utilizing the graphic engine 202, the spool file manager 704 loads a despooler 705, which has been stored in the external memory 111, into the RAM 102 and instructs the despooler 705 to execute print processing of a page description file of intermediate code described in the spool file 703. As a result, in accordance with a job settings file that contains manipulation settings information included in the spool file 303, the despooler 705 manipulates the page description file of intermediate code contained in the spool file 703, generates a GDI function again and outputs the GDI function via the graphic engine 202.

In a case where a print instruction (DDI function) which the dispatcher 701 receives from the graphic engine 202 is a print instruction (GDI function) sent from the despooler 705 to the graphic engine 202, the dispatcher 701 sends the print instruction to the printer driver 203 and not the spooler 702. As a result, on the basis of the DDI function acquired from the graphic engine 202, the printer driver 203 generates a print control command comprising page description language or the like and outputs the command to the printer 150 via the system spooler 204.

FIG. 7 illustrates an example in which the extended system described thus far is additionally provided with a previewer 706 and settings editor 707 to make possible previewing, modification of print settings and combining of a plurality of jobs.

Figure 8A:
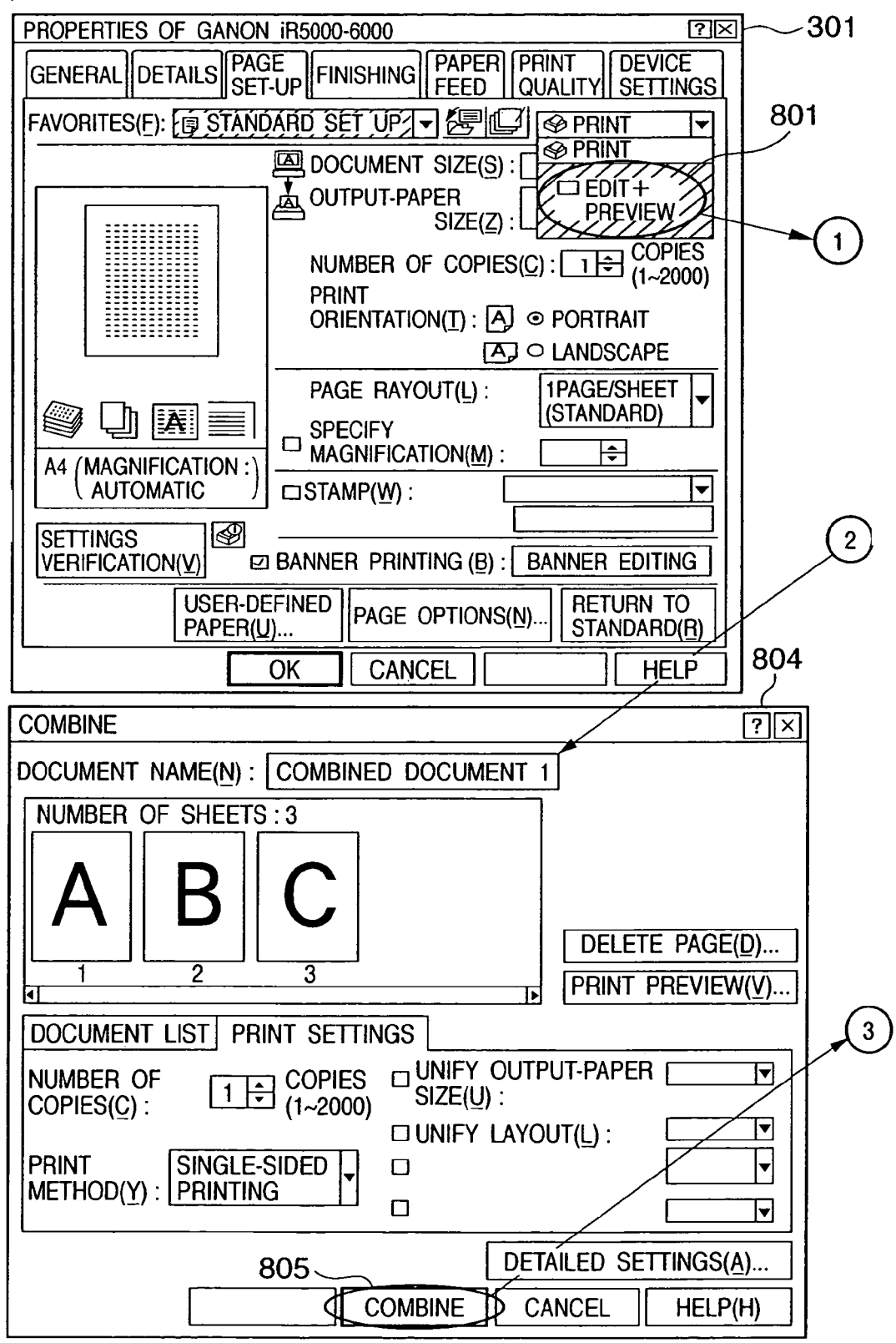

In order to preview a job, modify settings and combine a plurality of jobs, it is necessary for the user to specify "EDIT+ PREVIEW" by a pull-down menu 801 that functions as means for performing "OUTPUT DESTINATION DESIGNATION" on the user interface 301 based upon the printer driver 203 shown in FIG. 8A.

The content that has been set in the properties window of the printer driver 203 (301 shown in FIG. 8A) is stored as a settings file in a structure (referred to as "DEVMOD" in the Windows operating system). In this structure, a setting as to whether storage is performed in the spool file manager 704 is included in the manipulation settings contained in the spool file 703, by way of example. If the spool file manager 704 has read in manipulation settings via the printer driver 203 and a store designation has been made, a page description file and a job settings file are generated and stored in the spool file 703 in the manner described above. As shown in FIG. 8B, a window screen 802 of the spool file manager pops up and jobs that have been spooled in the spool file 703 are displayed as a list.

The screen 802 shown in FIG. 8B illustrates an example in which three jobs have been spooled. Jobs can be manipulated by clicking on a menu bar or on menu icons that appear below the menu bar. Eleven types of manipulation are possible in a state in which a job has been selected. These are "PRINT"; "SAVE AND PRINT", in which a spool file of intermediate code is left as is and printed; "PREVIEW", which is for viewing an output preview of a job that takes print settings into consideration; "DELETE", which is for deleting a spool file of intermediate code; "COPY", which is for generating a copy of a spool file of intermediate code; "COMBINE", which is for combining multiple jobs of spool files of intermediate code into a single job; "DIVIDE", which is for dividing combined jobs into the original plurality of jobs; "JOB EDIT", which is for changing the print settings (layout settings or finishing settings, etc.) of an individual job or combined jobs; "MOVE TO TOP", which is for making a certain job the top of the queue; "MOVE UP BY ONE", which is for moving the job one up in the queue; "MOVE DOWN BY ONE", which is for moving the job one down in the queue; and "MOVE TO BOTTOM", which is for moving the job to the bottom of the queue. Here the "COMBINE" operation, which is related to this embodiment, will be described.

First, as shown in FIG. 8B, job combine processing is started by clicking on the menu bar window screen 802 or on an icon button 803 that specifies combining after a plurality of spool files being displayed on the window screen 802 of the spool file manager are selected. In a case where combine processing has started, the settings editor 707 that has been stored in the external memory 111 is loaded in the RAM 102 and the settings editor 707 is instructed to display the top job of the list or default manipulation settings. A screen 804 of the settings editor is displayed as shown in FIG. 8A.

With regard to each job, the settings editor screen 804 is capable of displaying manipulation settings prevailing prior to combining as well as changes and revisions to unified manipulation settings serving as combined jobs. It does not matter whether settable items of the printer driver 203 are displayed on the user interface of the settings editor 707 or whether the user interface of the printer driver 203 per se is called.

With regard to combined jobs and items that have been changed, if a change is authenticated in accordance with a user authentication request issued by clicking a "COMBINE" button on the settings editor screen 804, control for this purpose shifts to the spool file manager 704. As a result of these operations, a plurality of jobs selected previously are displayed as one combined job 807 on a screen 806 of the spool file manager.

If the user requests printing by clicking on the menu bar provided on the spool manager screen 806 or on an icon button 808 that designates printing, then the spool file manager 704 issues a print request. If the print request is issued, the despooler 705, based upon the settings for combining operation specified by the spool file manager 704, outputs intermediate data of pages included in the combined job to the graphic engine 202 again. In response, a print instruction is sent from the graphic engine 202 to the printer driver 203 via the dispatcher 701 and printing is executed. Combined print jobs that have been sent to the printer driver 203 are processed as one print job in a manner similar to that of ordinary printing. After a conversion is made to print data, the data is transferred to the printer 150 via the system spooler 204.

As a result, the printer 150 performs printing in accordance with the print settings specified in the job. At this time the jobs transferred to the printer 150 are such that combining of jobs is transparent to the user in terms of data structure and therefore batch finishing processing and layout printing can be executed in the form of one job.

Described next will be an example of an embodiment of the invention that presumes a printing system having two functions, namely a function for banner printing and a function for combining of jobs, described above.

The present invention is applied in a case where banner printing and combining of jobs are used in conjunction.

FIG. 9 is a diagram illustrating an example of output results when joint use is made of banner printing and combining of jobs. Consider a case where a job combine operation is applied to print jobs 901 for which banner printing has been set. In order to obtain a printout that is faithful to the print settings made by the user, it is desired that combining be carried out in a state in which the settings of banner printing that have been made will be reflected in each print job and that the printout generated will be such that banner printing is applied to the beginning of the usual printout from within each application.

However, if processing such as a designation of finishing or a change in layout is applied to such combined jobs, processing in a form that also includes banner printing will executed and, as a result, a printout that the user finds inappropriate is provided. In FIG. 9, reference numeral 903 denotes an output result in a case where stapling has been specified, and reference numeral 904 represents an output result in a case where two pages per sheet has been specified. Similar problems occur also in case of doubled-sided printing and when page numbers are applied.

Figure 10:
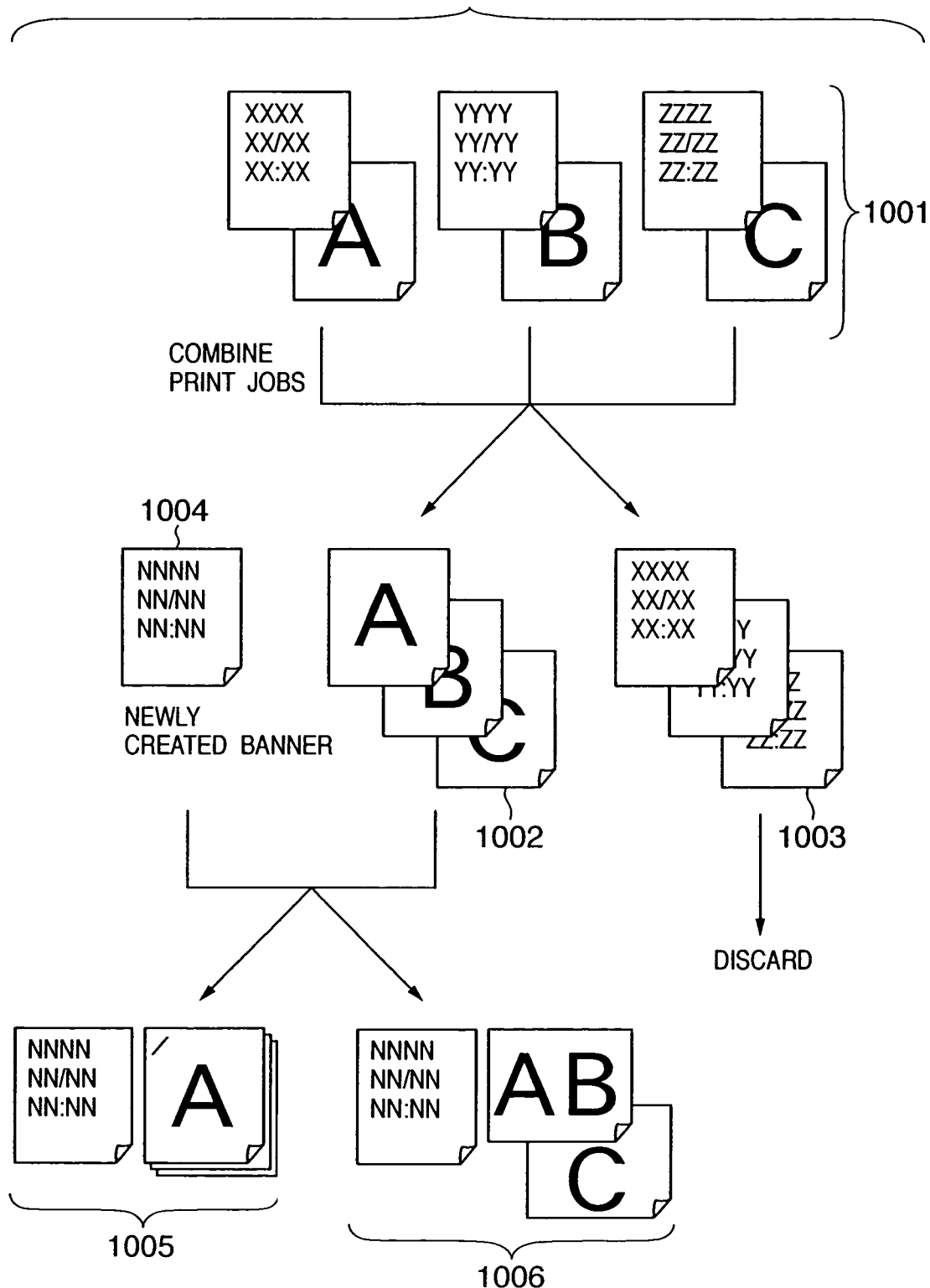
FIG. 10 is a diagram useful in describing job combine processing according to this embodiment.

Processing illustrated in FIG. 10 is adopted in this embodiment in order to avoid the above-mentioned problems. When processing for combining of jobs is applied to a plurality of print jobs 1001 for which processing such as finishing designation or layout change and banner printing have been specified, as mentioned above, settings 1003 of banner printing in the spool file 703 are discarded. Next, the ordinary print jobs obtained by removal of the banner settings are processed in a manner similar to that of ordinary combining of jobs to thereby generate a single print job 1002. Then, at the timing at which print processing is applied to the combined job, the setting of new banner printing 1004 is generating internally and this is added onto the combined print job 1002. As a result, an output in a form desired by the user, as shown in FIG. 10, can be obtained even in a case where finishing processing 1005 such as stabling is executed or in a case where processing 1006 for layout change such as two pages per sheet is executed.

It should be noted that the above-described processing deals with a case where it is predicted that a problem will occur, as when settings for finishing processing and for layout change are made concurrently. By refraining from executing the above processing with regard to other cases, it is possible to provide results that are faithful to the user settings just as heretofore.

Further, according to this embodiment, the object is to avoid problematic printing, in a manner that is transparent to the user, by changing over to avoidance processing automatically. However, by providing the user interface with a function involved in executing the above processing, it is possible to allow the user to made the designations explicitly.

Described next will be the details of processing for combining multiple jobs for which setting of banner printing and setting of finishing processing or layout change have been made concurrently.

Figure 11B:
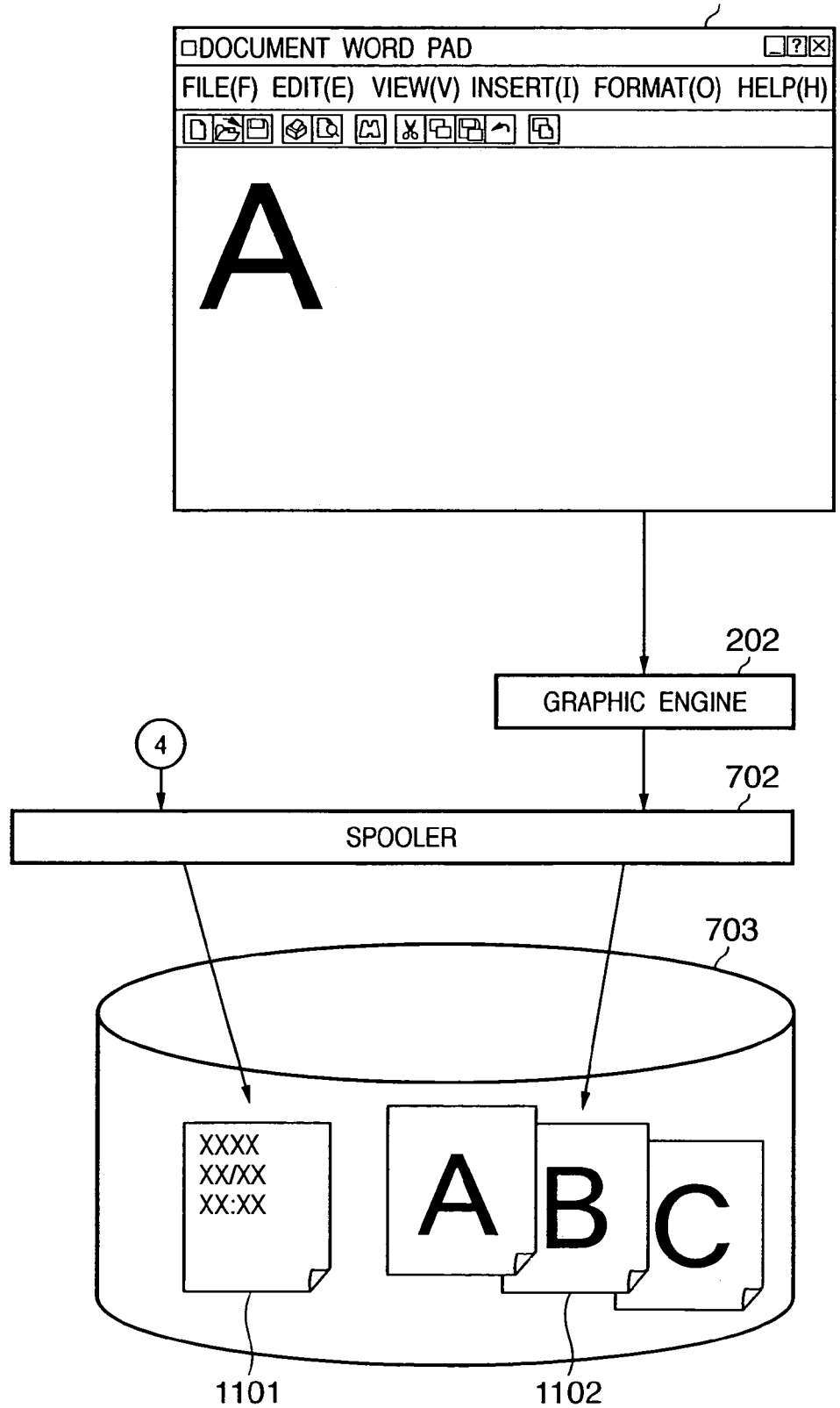

First, in order to implement this embodiment, processing for creating the spool file 703 of the spooler 702 is set, as shown in FIGS. 11A and 11B, taking the banner printing settings into consideration. This is a step that precedes combine processing. The settings of banner printing specified by the user interface 301 and banner setting screen 403 are converted to print data the first time when print data is generated by the printer driver 203 as described above. That is, at the time of this processing, the settings have merely been stored in the RAM 102 or external memory 111 and are not print data. On the basis of these settings, the spooler 702 creates intermediate data 1101 internally at the same time that it spools the ordinary print data created from the application 201. This is to facilitate operation involved in the job combine processing that will follow. The created intermediate data 1101 is stored as the spool file 703 by the spooler 702 in a manner similar to that of the ordinary print data. It should be noted that this processing is executed only with regard to print jobs for which banner printing has been designated.

On the other hand, with regard to ordinary print data from within the application 201, the data is converted to intermediate data 1102 by the graphic engine 202 in a manner similar to that of ordinary processing regardless of banner printing settings, and the intermediate data is stored as the spool file 703.

Next, the details of processing executed when jobs are actually combined by the settings editor 707 will be described.

Figure 12:
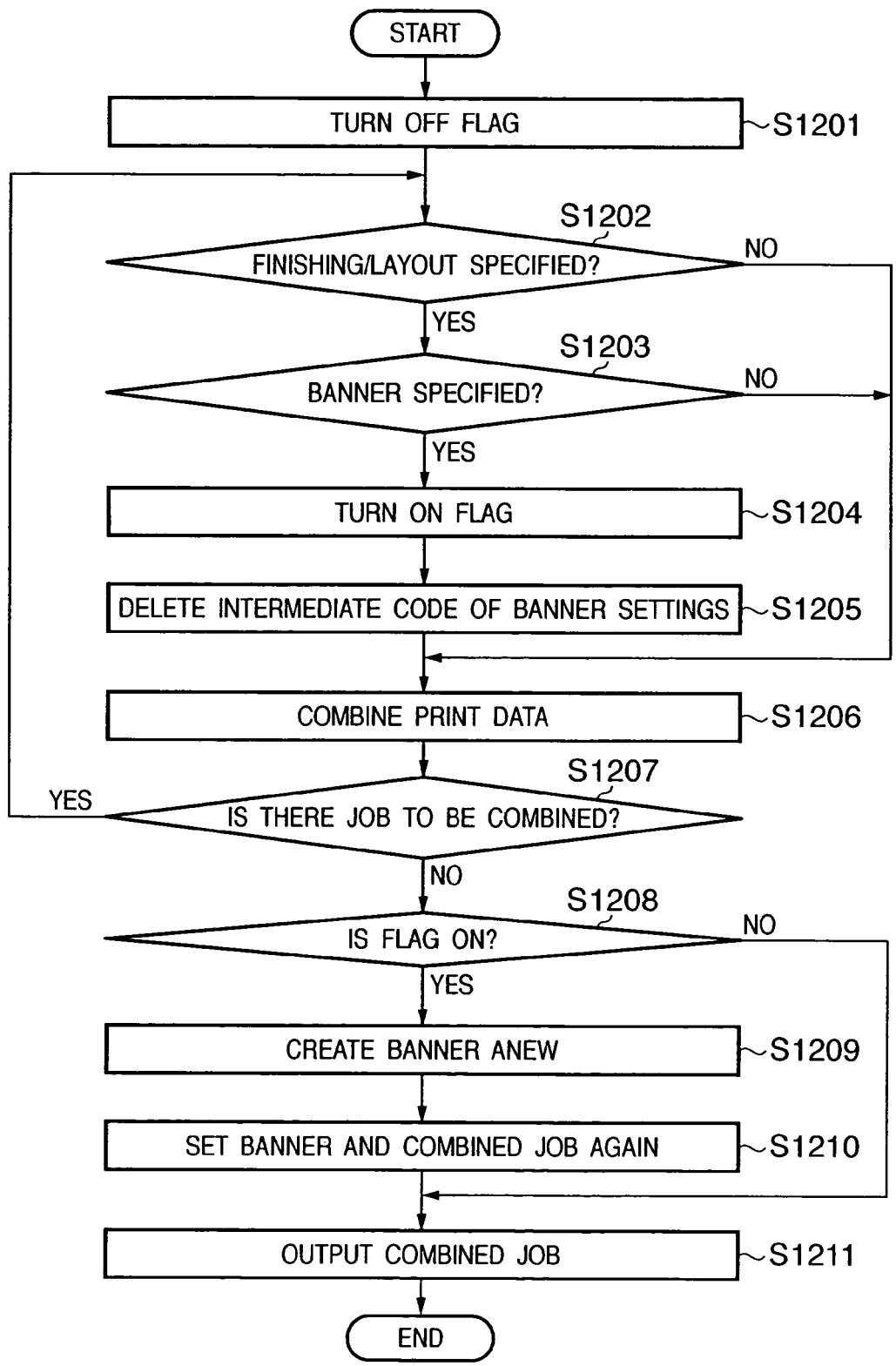
FIG. 12 is a flowchart illustrating processing at the time of jobs are combined according to this embodiment.

FIG. 12 is a flowchart illustrating processing executed when jobs are combined. First, at step S1201, settings for banner printing are cleared when jobs are combined, after which a flag for setting the banner again is turned off with respect to the combined jobs. Next, at step S1202, the combined jobs are checked to determine whether processing for which problems are predicted, such as finishing processing or layout processing, has been executed. Control proceeds to step S1206 if such settings have not been made and to step S1203 if such settings have been made. Whether banner printing has been specified is checked at step S1203. Control proceeds to step S1206 if banner printing has not been specified and to step S1204 if it has been specified. The above-mentioned flag is turned on at step S1204. Then, at step S1205, the intermediate code of the banner settings stored in the spool file 703 are deleted.

Next, at step S1206, job combine processing is started with regard to print data that has been stored in the spool file 703. In this case, combine processing is performed just as usual with regard to the spooled jobs without the user being particularly aware of whether banner settings have been made or not. This is followed by step S1207, at which it is determined whether a job to be combined still remains. If a job remains, control returns to step S1202 and the above-described processing is repeated. When the combining of specified jobs ends, control proceeds to step S1208, where it is determined whether the above-mentioned flag is on. If the flag is not on, control proceeds to step S1211. At step S1208, processing for banner settings or for layout change has not been specified and therefore no problems will arise. Accordingly, control proceeds to step S1211.

If the flag is found to be on at step S1208, control proceeds to step S1209, at which settings for banner printing are created anew internally. Next, at step S1210, the created banner and the already combined print data are made one job. It should be noted that the banner job settings have already been spooled as intermediate data corresponding to print data of one page and therefore the settings are included automatically by this processing at a position faithful to the user settings.

It should be noted that the content of banner printing created at step S1209 is assumed to be in accordance with a default setting of the printer driver in this embodiment. However, a user interface may be provided anew and the settings may be made again. Further, it may be so arranged that continuation is allowed upon selecting one of the settings made with regard to a job prior to combining.

Next, at step S1211, already combined intermediate data created by combine processing is sent to the printer driver 203 via the despooler 705 and graphic engine 202 attendant upon designation of start of printing by the user in the spool file manager 704.

In case of jobs for which finishing processing and layout change have not been specified in the above-described combine processing, i.e., in a case where resetting of a banner has not been performed, banner printing is already included as one page of print data in the form of intermediate code. Therefore, ordinary print processing is executed, print data is created, the data is output to the system spooler 204 and the data is transferred and output to the printer 150.

FIG. 13 is a diagram illustrating the structure of a print job in a case where a banner has not been reset. Here print data for banner printing is in a form in which it exists as one page of ordinary print data, unlike when ordinary banner printing shown in FIG. 5 is performed.

On the other hand, in a case where finishing processing or layout change has been specified in the above-described combine processing, i.e., in a case where resetting of a banner has been performed, print data for banner printing is created based upon the settings in a manner similar to that in the case where ordinary banner printing is performed. The created print data is based upon settings re-attached to combined jobs in combine processing.

FIG. 14 is a diagram illustrating the structure of a print job in a case where a banner has been reset. Banner printing is isolated internally, in a manner similar to that when ordinary banner printing shown in FIG. 5 is performed, and it is so arranged that there will be no influence from finishing and layout designation set with regard to a combined job.

In accordance with this embodiment described above, two types of processing are used selectively in accordance with circumstances, thereby making it possible to avoid problems and to provide the user with the optimum output.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiment to a system or an apparatus, reading the program codes with a computer (e.g., a CPU or MPU) of the system or apparatus from the recording medium, and then executing the program codes.

In this case, the program codes per se read from the recording medium implement the novel functions of the embodiment, and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the recording medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with this embodiment, as described above, it is possible to provide a user with the optimum printout by making it possible to avoid problems when combining jobs for which setting of banner printing and setting of finishing processing and layout processing have been made concurrently, and by adapting processing to circumstances.

As many apparently widely different embodiments of the present invention can be made without departing from the spirit and scope thereof, it is to be understood that the invention is not limited to the specific embodiments thereof except as defined in the appended claims.

What is claimed is:

1. A method of sending a print job to a printing apparatus in an information processing apparatus having a printer driver for generating the print job, the method comprising:

a first generation step of generating a combined print job by combining a first print job and a second print job, the first print job including first page data and first banner print data for printing a document name of the first print job, the second print job including second page data different from the first page data and second banner print data for printing a document name of the second print job;

a second generation step of generating new banner print data for printing a new document name different from the first document name and the second document name, for the combined print job generated in the first generation step; and a sending step of sending the new banner print data generated in the second generation step, the first page data and the second page data to the printing apparatus, as the combined print job, such that the new document name, without printing the document name of the first print job and the document name of the second print job, is printed on a sheet.

2. The method according to claim 1, wherein, in the first generation step the combined print job is generated by disabling data on execution of banner printing included in the first and second print jobs.

3. The method according to claim 1, further comprising a setting step of setting layout information on a number of pages laid out on a print sheet for the single print job, wherein the layout information is applied to the combination print data without being applied to the banner print data, and the single print job is outputted to the printing apparatus in the output step.

4. An information processing apparatus for sending a print job to a printing apparatus, said information processing apparatus having a printer driver for generating the print job, comprising:

a first generation unit adapted to generate a combined print job by combining a first print job and a second print job, the first print job including first page data and first banner print data for printing a document name of the first print job, the second print job including second page data different from the first page data and second banner print data for printing a document name of the second print job;

a second generation unit adapted to generate new banner print data for printing a new document name different from the first document name and the second document name, for the combined print job generated by said first generation unit; and a sending unit adapted to send the new banner print data generated by said second generation unit, the first page data and the second page data to the printing apparatus, as the combined print job, such that the new document name, without printing the document name of the first print job and the document name of the second print job, is printed on a sheet.

5. A computer-readable storage medium storing a computer-executable program for causing a computer to implement the printing control method set forth in claim 1.

6. The method according to claim 1, wherein the banner print data is data indicating designation of banner printing or banner pages.

7. The apparatus according to claim 4, wherein said first generation unit generates the combined print job by disabling data on execution of banner printing included in the first and second print jobs.

8. The apparatus according to claim 4, further comprising a setting unit adapted to set layout information on a number of pages laid out on a print sheet for the single print job, wherein the layout information is applied to the combination print data without being applied to the banner print data, and the single print job is outputted to the printing apparatus by said output unit.

9. The apparatus according to claim 4, wherein the banner print data is data indicating designation of banner printing or banner pages.

* * * * *